United States Patent
Goss et al.

[11] Patent Number: 6,002,551
[45] Date of Patent: Dec. 14, 1999

[54] SUSPENSION ATTACHMENT TECHNIQUE AND APPARATUS FOR ATTACHING SUSPENSION TO AN ACTUATOR ARM IN A DISK DRIVE

[75] Inventors: Lloyd Chambers Goss, Bloomington; James M. Adley, Hutchinson, both of Minn.

[73] Assignee: Questak Innovations, Inc., Waconia, Minn.

[21] Appl. No.: 08/977,784

[22] Filed: Nov. 25, 1997

[51] Int. Cl.[6] .................................................... G11B 5/48
[52] U.S. Cl. ............................................................ 360/104
[58] Field of Search .................................... 360/104–106

[56] References Cited

U.S. PATENT DOCUMENTS

| | | | |
|---|---|---|---|
| 4,829,395 | 5/1989 | Coon et al. | 360/104 |
| 4,943,875 | 7/1990 | Reidenbach | 360/104 |
| 5,198,945 | 3/1993 | Blaeser | 360/104 |
| 5,283,704 | 2/1994 | Reidenbach | 360/104 |

FOREIGN PATENT DOCUMENTS

| | | | |
|---|---|---|---|
| 60-074170 | 4/1985 | Japan | G11B 21/21 |
| 62-256279 | 11/1987 | Japan | G11B 21/21 |

*Primary Examiner*—A. J. Heinz
*Attorney, Agent, or Firm*—Schwegman, Lundberg, Woessner & Kluth PA

[57] ABSTRACT

A disk drive system includes a base, a disk rotatably attached to the base, and an actuator assembly movably attached to the base. The actuator assembly moves the transducer to selected areas of the disk where information representative of data is to be written or read. The transducer is attached to the suspension. The arm has at least one suspension attached thereto using a wire wound sleeve or wrap. The wire wound sleeve or wrap surrounds the end of the arm and captures one or two suspensions between the arm and the wire wound coil. A transducer is attached to the suspension. The electrical connections between the arm and the suspension can also be made along with the mechanical connection of these two elements.

30 Claims, 10 Drawing Sheets

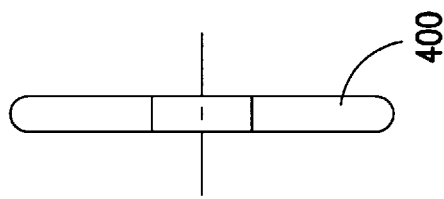
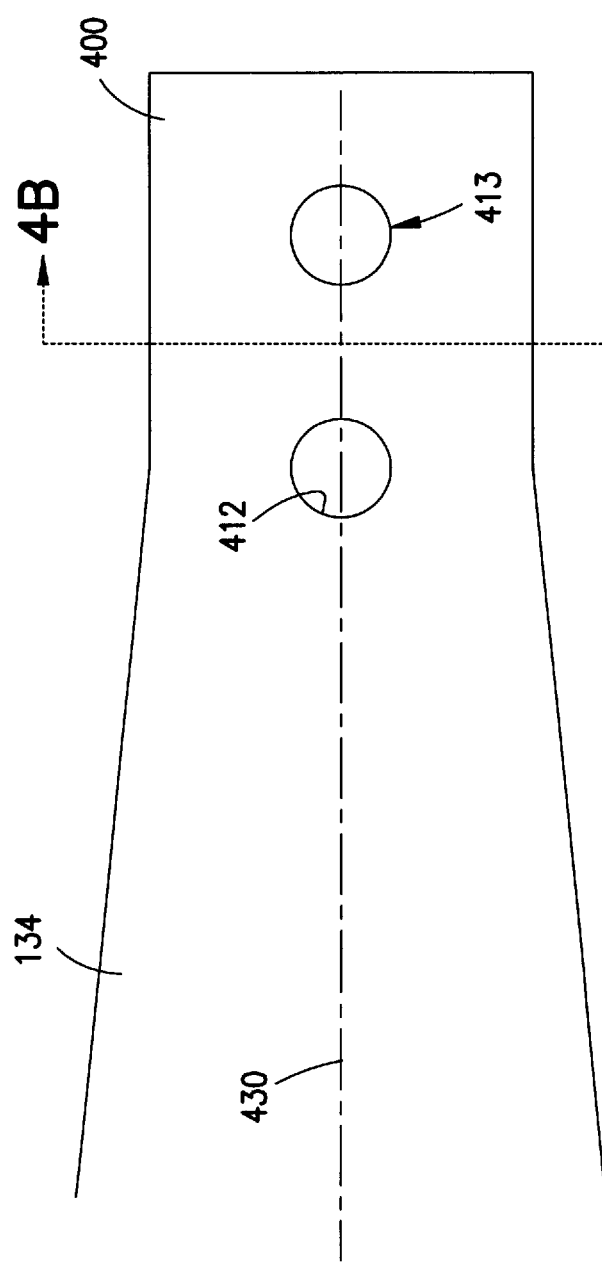
FIG. 4B
FIG. 4A

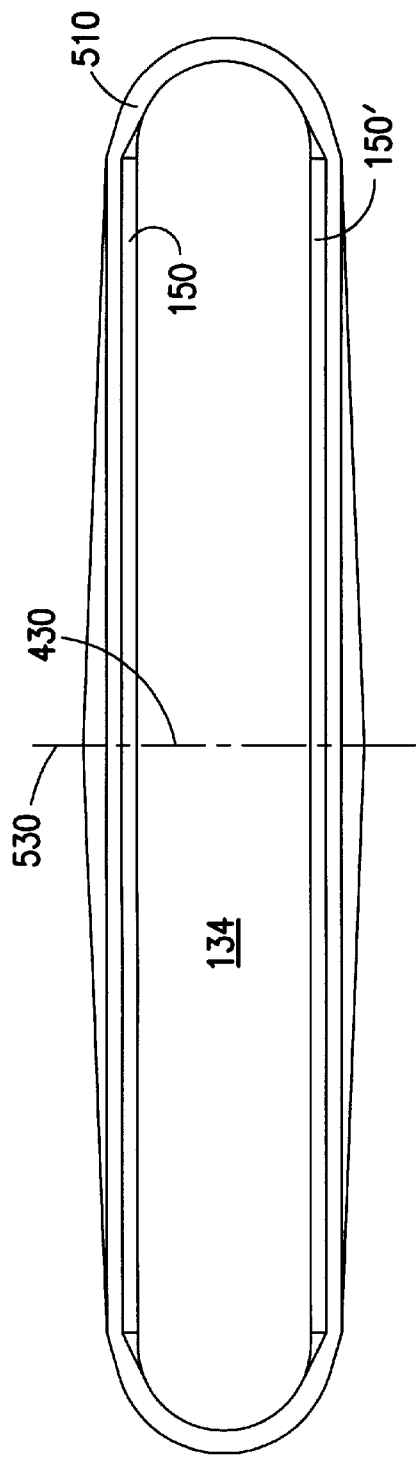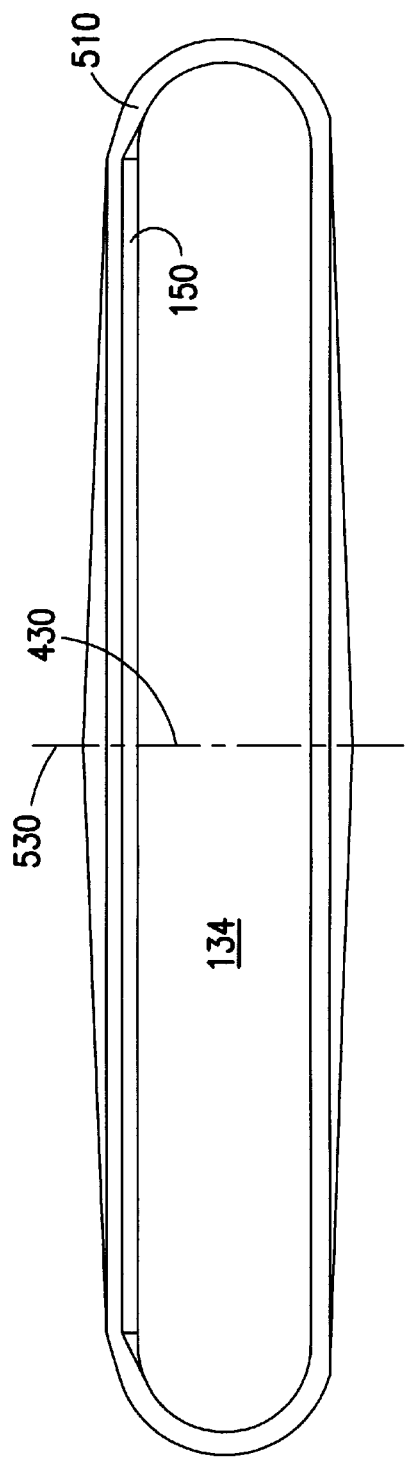

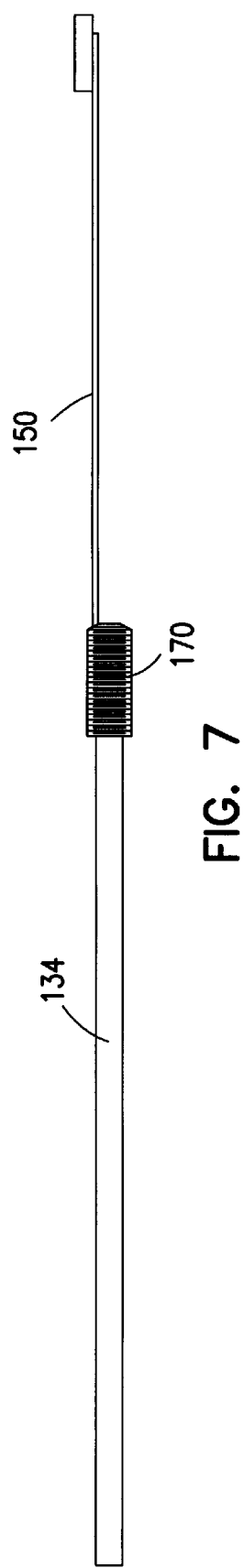
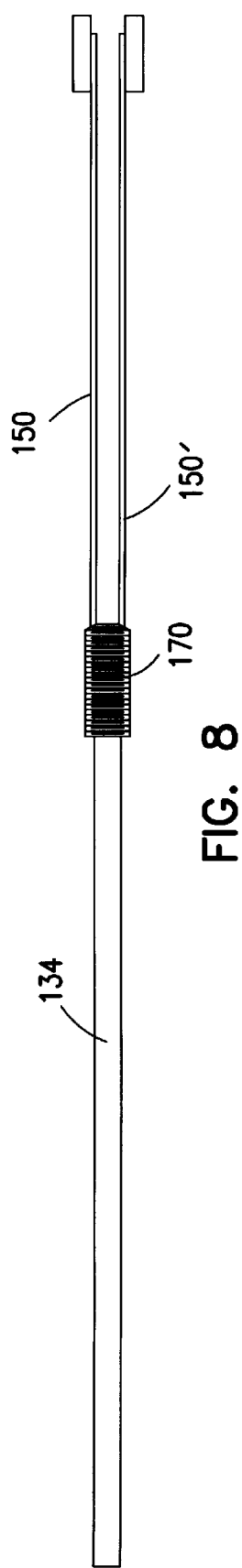

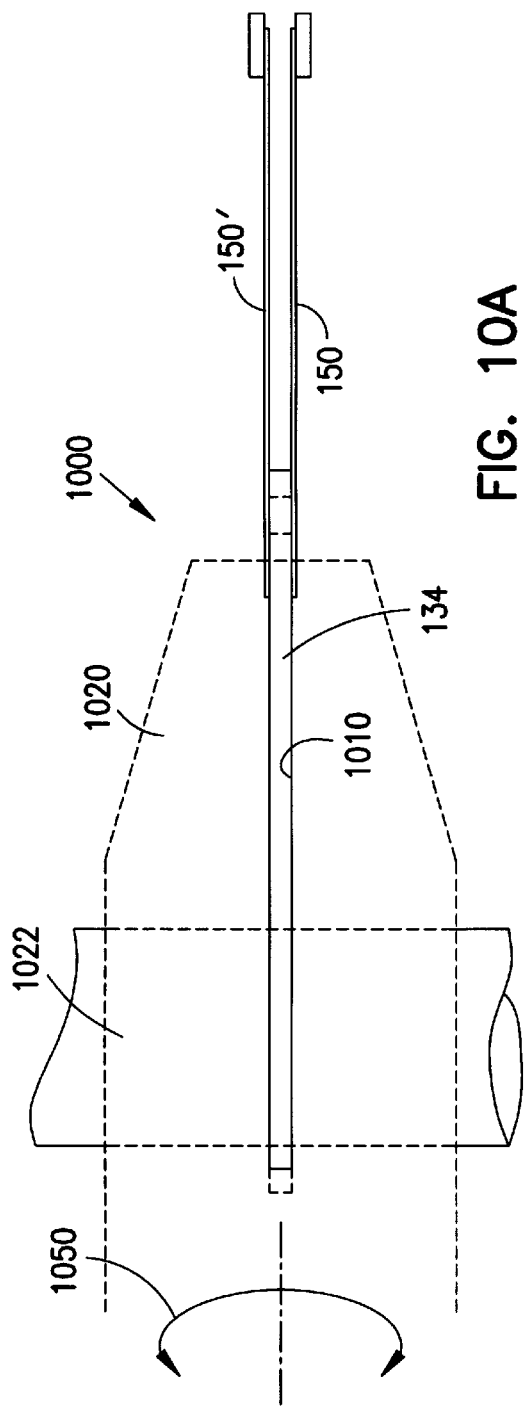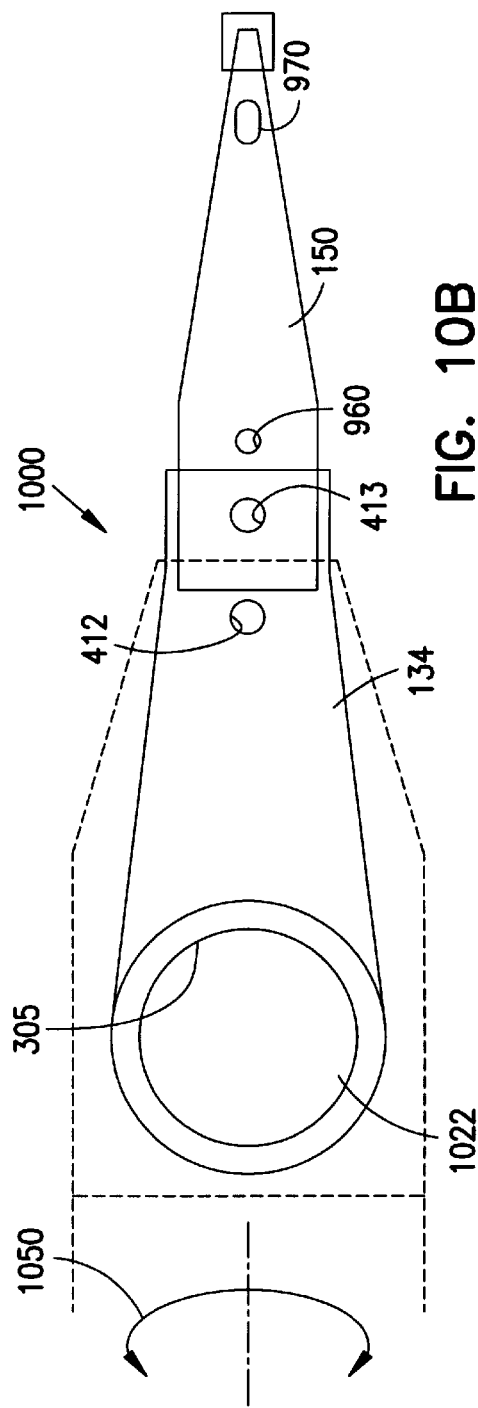

SUSPENSION ATTACHMENT TECHNIQUE AND APPARATUS FOR ATTACHING SUSPENSION TO AN ACTUATOR ARM IN A DISK DRIVE

FIELD OF THE INVENTION

The present invention relates to the field of mass storage devices called disk drives. More particularly, this invention relates to a method and apparatus for attaching a suspension to an arm on an actuator assembly.

BACKGROUND OF THE INVENTION

One of the key components of any computer system is a place to store data. Computer systems have many different places where data can be stored. One common place for storing massive amounts of data in a computer system is on a disk drive. The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is passed over the disk in a transducing relationship with the disk. The transducer can be used to read information representing data from the disk or write information representing data to the disk. When the disk is operating, the disk is usually spinning at relatively high RPM. These days common rotational speeds are 5100 and 7200 RPM. Rotational speeds of 10,000 RPM and higher are contemplated for the future. At such speeds, the very small ceramic block flies on a very thin layer of gas or air. In operation, the distance between the small ceramic block and the disk is very small. Currently "fly" heights are about 0.0003 mm. In some disk drives, the ceramic block does not fly on a cushion of air but rather passes through a layer of lubricant on the disk.

Information representative of data is stored on the surface of the memory disk. Disk drive systems read and write information stored on tracks on memory disks. Transducers, in the form of read/write heads, located on both sides of the memory disk, read and write information on the memory disks when the transducers are accurately positioned over one of the designated tracks on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held very accurately during a read or write operation using the servo information.

The actuator assembly is composed of many parts that contribute to the performance required to accurately hold the read/write head in the proper position. An actuator includes a pivot assembly, an arm, a voice coil yoke assembly and a head gimbal suspension assembly. A suspension or load beam is part of the head gimbal suspension assembly.

One end of the suspension is attached to the actuator arm. The read/write head is found attached to the other end of the suspension. One end of the actuator arm is coupled to a pivot assembly. The pivot assembly is in turn connected to a servo motor system through the voice coil yoke. The other end of the actuator arm is attached to the head gimbal assembly. The head gimbal assembly allows the read/write head to gimbal for pitch and roll to follow the topography of the imperfect memory disk surface. The head gimbal also restricts motion with respect to the radial and circumferential directions of the memory disk. The suspension is coupled to the actuator arm as part of the mounting support holding the pivot support and coupled to the servo motor. Currently, the pivot assembly is mounted within an opening in a unitized, machined E-block. The E-block includes arms for mounting the suspension on one end and a voice coil yoke on the other end. U.S. Pat. No. 5,283,704 issued to Reidenbach illustrates another actuator system composed of individual components instead of the unitized E-block. This actuator system is "built up" from an actuator arm, spacer rings, a separate voice coil yoke frame assembly, and a separate bearing cartridge. A voice coil is located on the voice coil yoke. The voice coil and magnets attached to the housing of the disk drive form a voice coil motor. The disk drive includes a feedback control loop to enable accurate positioning of the transducer. The disk drive system sends control signals to the voice coil motor to move the actuator arm and the suspension supporting the read/write head across the memory disk in a radial direction to the target track. The control signals indicate to the motor the magnitude and direction of the displacement. The control signals can also be used to maintain the position of the read/write head or transducer over a particular track.

Actuator arms act as spring-mass-damper systems and have resonant frequencies that can degrade the performance of the servo system. Every closed loop servo motor system has a predetermined bandwidth in which resonances occurring within the bandwidth degrade the performance of the servo motor system. The actuator arm is one key source of unwanted resonances. Accordingly, the bandwidths of most servo motor systems are designed such that resonances of the actuator arm occur outside the bandwidth. Each actuator arm has a unique resonance characteristic. Current actuator arms are made of stainless steel, aluminum or magnesium. Suspensions are typically made of stainless steel. The resonance characteristics of the arm are such that the bending modes and torsion modes have frequencies that are within the same frequency range as the suspension and the magnetic storage disk (1 KHz to 8 KHz). Great care must be used when designing an actuator system to prevent alignment of resonance modes that would create very high gains and an unstable servo performance.

In other words, in the presence of a resonance, the transducer or read/write head will vibrate causing it to pass across the desired track. When the resonances of the disk and actuator align or are about the same frequency, the frequency response is amplified so that the amplitude of the vibration is higher and the read/write head travels farther away from the desired track during the track crossings.

The key parameter determining the resonance characteristics of the actuator arm is the stiffness-to-mass ratio of the material. The stiffness-to-mass ratio is about the same for aluminum and stainless steel. Of currently available materials, beryllium and ceramics have significantly higher stiffness-to-mass ratios over that of currently used stainless steel or aluminum. Beryllium is quite expensive and difficult to process while ceramics are prone to crack, particularly under the shock load conditions associated with ball swaging or operational shock loads. As a result, these materials have not become market acceptable for use as actuator arms.

Currently, the predominant method for attaching suspensions to metal arms is a process referred to as ball swaging. As shown in U.S. Pat. No. 4,829,395 issued to Coon et al., the metal arm is provided with an opening. An insert called a swage plate includes a tubular boss. A suspension is typically welded to the swage plate. The boss and attached suspension are positioned on one side of the arm so that they extend into the opening of the arm. A second boss and attached suspension may be positioned on the other side of the arm so that the arm carries two suspensions. An oversized ball is forced through the opening in the one, or both of, the bosses. This forces the material of the bosses into the material of the arm to attach the suspension to the arm.

There are several problems associated with the swaging technique.

One of the problems is that the swage plates are heavy. Due to the weight of the swage plate or swage plates, the tendency in the industry is to go with short arms. The shorter the arm the lesser the rotational moment of inertia. The rotational moment of inertia depends on the weight of the object and the square of the distance away from the axis of rotation. The moment of inertia increases exponentially with the distance from the axis of rotation Increased moments of inertia translate into increased access times for the data. A constant goal of the industry is to lessen the seek times.

Another problem with swaging is that there is industry pressure to reduce the spacing between the disks in a disk stack to produce a shorter disk stack. Swage plates are relatively thick and limit the spacing between the disks of a disk stack having multiple disks. This keeps the height of the disk stack relatively high. In addition, swaged connections are difficult to rework. If an actuator assembly having a swaged connection is found to be faulty, the entire actuator assembly must be reworked (all the suspensions must be removed and replaced). Another shortcoming of swaging is that it is limited with respect to the type of material that the boss can be forced into. Currently, most arms are made of metal and undergo plastic deformation during the swaging process. Arms made of a more brittle or hard material will simply crack or fail upon being shock loaded by forcing the swage ball through the opening in the boss. As a result, swaging limits the type of arm materials to materials capable of plastic deformation, such as metals. The conventional swaging attachment requires a ductile material having a relatively low elastic modulus such as aluminum or magnesium. This enables the boss of the suspension base plate to expand and yield into an interference fit into the mounting hole in the end of the actuator arm. Arms made from ceramic and composite arm materials, which have a relatively high elastic modulus and low ductility, do not lend themselves to swaging process. The ceramic and composite materials exhibit very high compressive strength and lend themselves to attachment methods which clamp the suspension base between the arm and a thin outer conforming sleeve which is held in a state of high internal tension. The appeal for using a ceramic or a composite as an arm material is that some of these materials, although hard and brittle, are lighter and less susceptible to resonant vibration in the frequency of operation of the disk drive. These materials have a lower moment of inertia and also resonate at frequencies beyond the frequencies which normally occur during the operation of the disk drive.

Another problem associated with swaging as well as most other methods for connecting the arm and the suspension is that the electrical connections between the electronics on or near the arm, such as a preamplifier, and the transducer attached to the suspension must be made in a separate step. This takes additional assembly time which also results in increased cost for the suspension as attached to the arm.

Another less common form of attaching a suspension to an arm is by welding. The ceramic and composite arm materials are not compatible with the stainless steel suspension for welding.

The demand for greater track density is increasing steadily, so increasing the performance of the actuator assembly by lowering the mass and increasing the resonance frequencies is becoming a requirement for future systems. There is a need for a disk drive system having an actuator arm which has a higher stiffness-to-mass ratio than actuator arms made of stainless steel, aluminum or magnesium. This would produce a disk drive having lower access times and higher track density. Furthermore, there is a need for a method of attaching a suspension to an actuator that enables different arm materials having a higher stiffness-to-mass ratio than actuator arms made of stainless steel, aluminum or magnesium, to be used. There is also a need for an attachment method that will accommodate materials having different thermal coefficients of expansion.

SUMMARY OF THE INVENTION

A disk drive system includes a base, a disk rotatably attached to the base, and an actuator assembly movably attached to the base. The actuator assembly moves the transducer to selected areas of the disk where information representative of data is to be written or read. The actuator assembly maintains the transducer in a transducing relationship with the disk. The actuator assembly also includes an arm made of a material other than metal, such as a composite material or a ceramic material. At least one suspension is attached to the arm by a winding of wire material. Two suspensions can be attached to the arm using a single winding of wire material. The wire surrounds the end of the arm and captures the suspension or suspensions positioned between the arm and the band. The arm may be provided with a protruding attachment feature. The arm may also have an end with rounded edges.

A transducer is attached to each suspension. The suspension may place solid conductors onto the surface of the suspension which connect to the transducer at one end. The arm used has a set of wires located at the suspension connection end for making electrical connection to the solid conductors on the surface of the arm. The wires are either placed on a flex cable across the surface of the arm or emerge from a embedded position within the arm. The wires are positioned so that they align with the solid conductors on the suspension when the arm and suspension are aligned for attachment to one another. Therefore, aligning the arm and the suspension also aligns the solid conductors on the suspension and the wires on the arm. The force associated with attaching the suspension to the arm with the wire wrap provides an electrical connection between the wires on the arm and the conductors on the suspension. Advantageously, the attachment of the suspension to the arm, and the electrical connection can be made in a single step. In addition, the wire wrap attachment method accommodates mismatches in thermal coefficient of expansions between the arm and the suspension. The wire is wrapped with a tension that allows it to expand and still hold the suspension to the arm with an adequate amount of force. In addition, the attachment method does not require that the arm and the suspension have tight tolerances. The wire wrap results in a connection which is also much lighter than a connection using a single or double swage plate. The wire wrap will be one eighth the weight of a swage plate and one sixteenth the weight of a double swage plate. As a result, faster access times are achievable. Since the weight is less, there is less resistance to using a longer arm and shorter suspension since the moment of inertia will be relatively low. A rigid bond is produced without shock loading the ceramic or composite material of the arm. This reduces the possibility of an obvious crack or a latent failure forming as a result of using other methods of attachment of the suspension to the arm such as swaging. The attachment method disclosed enables the use of an arm made of a ceramic or composite which is a lighter, stiffer material with a very low coefficient of thermal expansion to be rigidly coupled to a stainless steel suspension with a high coefficient of thermal expansion. The lighter, stiffer materials used for the arm resonate at higher frequencies beyond the operating range of the disk drive servo system; those materials allow a rigid attachment mechanism based on their low coefficient of thermal expansion. The rigid attachment over a range of temperatures is absolutely necessary to assure mechanical vibration coupling and prevent the suspension from moving with respect to the arm on a rotary actuator during multiple high speed seeks.

BRIEF DESCRIPTION OF THE DRAWINGS

FIG. 4A is a top view of the attachment end of the actuator arm.

FIG. 4B is a cross-sectional view of the attachment end of the actuator arm.

FIG. 6B is a cross-sectional view of FIG. 6A showing the crossover wrap for attaching two suspensions.

FIG. 6C is a cross-sectional view of FIG. 6A showing details of wire crossover wrap for attaching a single suspension.

FIG. 7 is a side view of a single suspension element attached to the arm member.

FIG. 8 is a side view of two suspensions element attached to the arm member.

FIG. 10A is a side view of a wire wrap tool.

FIG. 10B is a top view of a wire wrap tool clamping the arm 134 and suspension 150.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
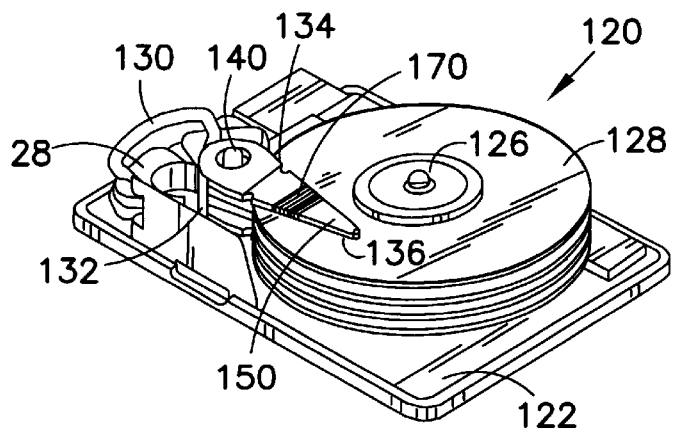
FIG. 1 is an isometric view of a disk drive having a rotating disk, an actuator, and an arm made of a composite material.
Figure 2:
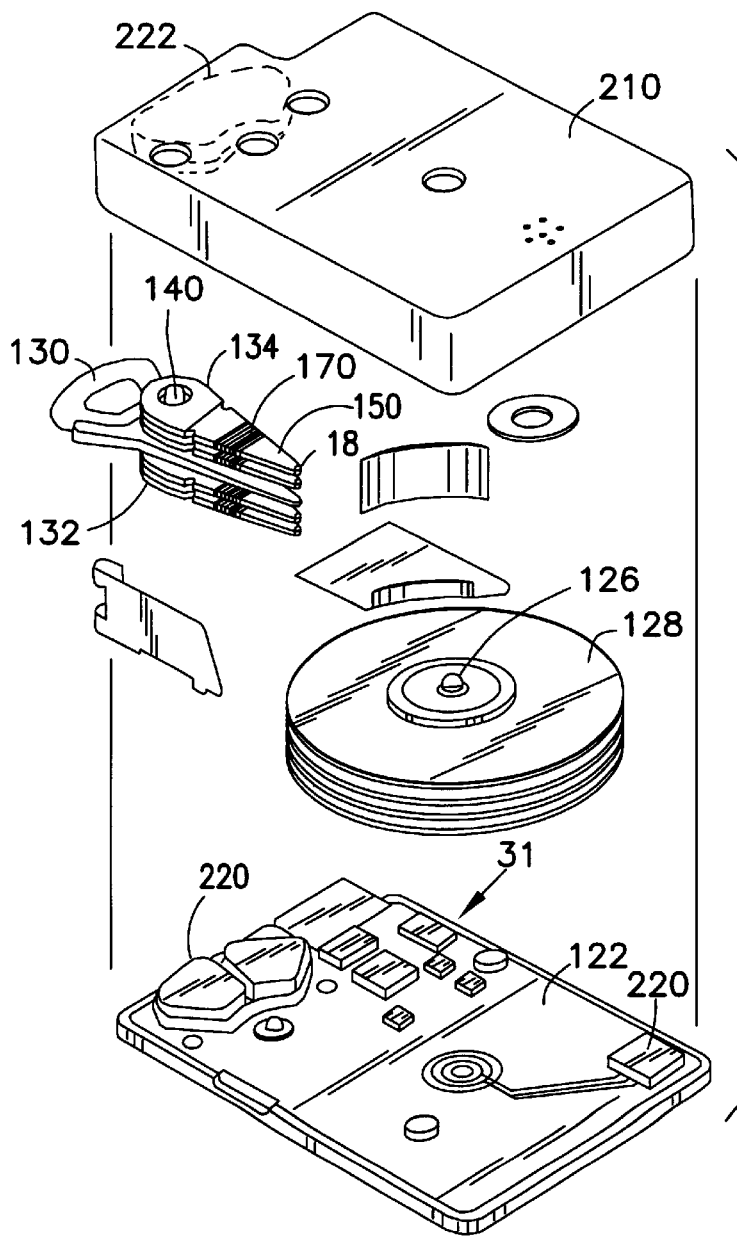
FIG. 2 is an exploded isometric view of a disk drive having a rotating disk, an actuator, and an arm made of a composite material.

Referring to FIGS. 1 and 2, the principal electrical and mechanical components of a disk drive constructed in accordance with a preferred embodiment of the present invention are illustrated. The disk drive includes a head/disk assembly ("HDA") 120 which includes a base 122 and a cover 210 (shown in FIG. 2). Attached to the base 122 is a spindle with an attached hub 126. Attached to the spindle with an attached hub 126 is a disk 128. Also attached to the base is a spindle motor for rotating the spindle with an attached hub 126 and the disk 128. Spindle motor driver circuitry 220 controls the current passing through the spindle motor to produce a torque and controllably rotate the hub and disk 128 attached to the spindle. An actuator assembly 132 is also attached to the base 122. The actuator assembly 132 includes arms 134 and suspensions 150 which carry transducers 136 in a transducing relation to the disk 128. The arms 134 are attached to a pivot apparatus, such as a bearing cartridge 140. The arms 134 could be made of any material, including magnesium, aluminum, stainless steel, ceramics or composites. Attached to the arms 134 are the suspensions 150. The suspensions 150 are attached to the arms 134 by a wire winding 170. The wire winding 170 surrounds the arm 134 and the one or two suspensions 150 attached to the arm. The transducers 136 are encapsulated within or supported by a slider or small ceramic block mounted to the suspension. The slider carries the transducer over the disk. The other end of the actuator assembly 132 includes a portion of an actuator motor 130. The portion of the actuator motor shown attached to the actuator assembly 132 is the voice coil. The actuator motor, formed of the voice coil and magnets 220 and 222 (shown in phantom), is used to move the actuator assembly 132 and, more specifically, the transducers 136, also commonly referred to as read/write heads, to different radial positions relative to one or more surfaces of the disk 128.

Figure 3:
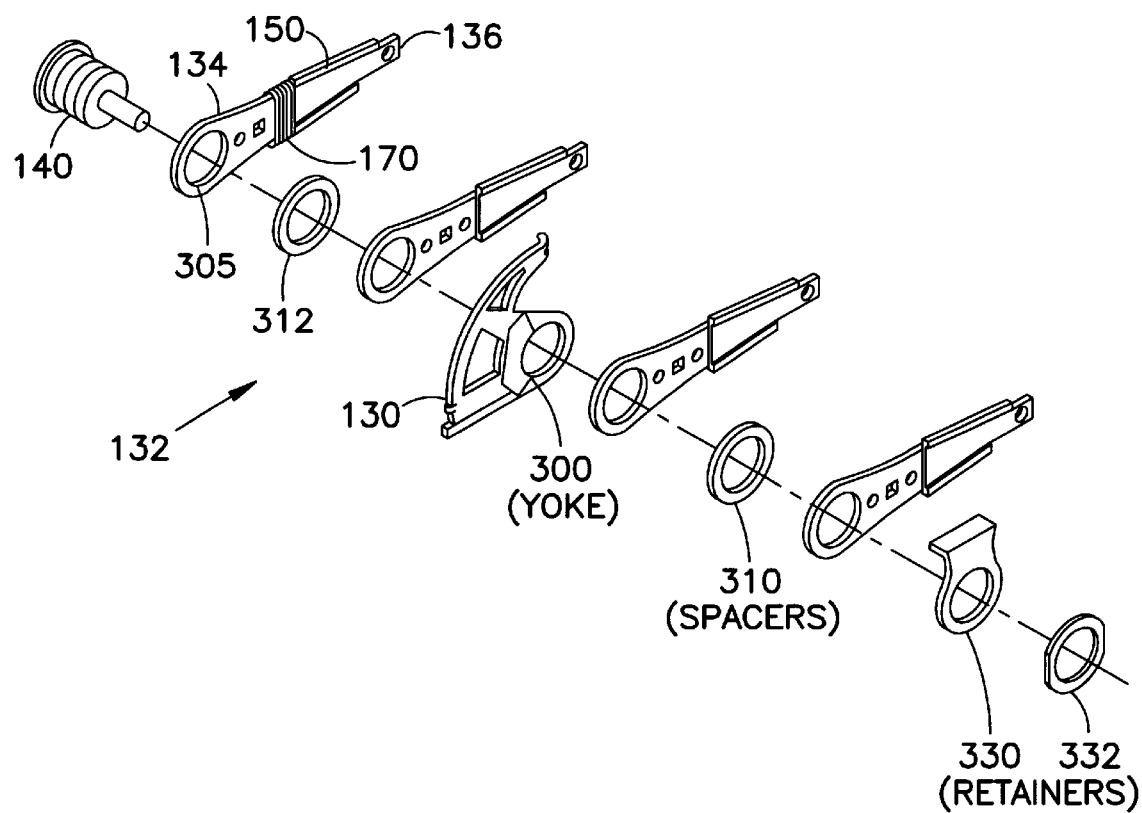
FIG. 3 is an exploded isometric view of an actuator assembly.

FIG. 3 is an exploded isometric view of an actuator assembly 132. The actuator assembly 132 includes a number of arms 134 having suspensions 150 attached to each of the arms. The suspensions 150 are attached to the arms 134 by a wire winding 170. The wire winding 170 surrounds the arm 134 at the attachment end, and the one or two suspensions 150 attached to the arm. Attached to each of the suspensions 150 is a transducer 136. Although four arms are shown in FIG. 3, only one is labeled with reference numerals since they are all substantially identical. The arm 134 has an opening 305 therein. The opening 305 fits over the outside diameter of the bearing cartridge 140. Several spacers 310 and 312 are also included in the actuator assembly 132. The spacers 310 and 312 space adjacent arms 134 away from each other such that the arms can pass between the disks 128. The actuator assembly 132 also includes a yoke 300 which holds the voice coil 130 of the voice coil motor. The yoke includes an opening 303 which also fits over the bearing cartridge 140. Also included are several retainers 330 and 332. The retainers 330 and 332 fit over the top of the bearing cartridge and maintain the actuator assembly 132 in an assembled position. The yoke 300 also serves as a spacer. During assembly, an arm 134 is formed and a suspension 150 is attached to one end of the arm 134. The suspension 150 typically carries the transducer 136. The first arm 134 is placed over the bearing cartridge such that the transducer faces upwardly or can read the bottom surface of one of the disks 128. A spacer 312 is then placed atop the first arm, a subsequent arm is then added to the bearing cartridge. The yoke 300 is then added as are another arm, another spacer 310 and a final arm. The entire assembly is held in place by the retainers 330 and 332. The actuator assembly 132 is usually assembled in a jig which includes an alignment mechanism. Each of the arms 134 includes an opening which can receive a rod or other withdrawable tool that can be used for alignment of the various components of the actuator assembly 132.

FIG. 4A is a top view of an actuator arm 134. The actuator arm 134 has an opening 305 at one end for attaching to a bearing cartridge (shown in FIG. 3). The other end is a suspension-attach region 400 (also called the attachment end). As shown in FIG. 4A, the attachment end 400 has rounded corners. It should be noted that the attachment end 400 does not necessarily have to have rounded corners, however, when the corners are rounded it pre(shown in FIG. 5) that occurs wire 510 (shown in FIG. 5) that occurs when the wire has to bend around an abrupt 90 degree corner. Any edge geometry that does not cause localized stress in the wire or arm may be used instead of rounded corners. For example, a multi-faceted side or edge could also be used to relieve localized stress. The arm 134 also includes a first alignment hole 412 and a second alignment hole 413 which accommodate alignment pins from a jig used to form the actuator assembly. The alignment holes 412 and 413 and the opening 305 are used to align the arm and maintain the alignment of the arm with the suspension as the wire 510 is wound around the actuator arm 400 during assembly.

The arm 134 also includes a longitudinal axis 430. The suspension is typically made of metal and usually made from stainless steel. The arm can be made of a composite material, such as described in applicant's copending application entitled "Disk Drive Using Fiber Composite Material", U.S. Ser. No. 08/912,874, which was filed on Aug. 15, 1997 and is hereby incorporated by reference. Other composite materials can also be used, such as 3M Company's (St. Paul, Minn.) composite material made of aluminum oxide and aluminum. The composite material does not necessarily require elongated fibers or layers of fibers. The arm 134 could also be made from a ceramic such as $AlB_4C$ Cermet which is available from Dow Chemical Company of Midland, Mich. Either the composite or the ceramic would have a coefficient of thermal expansion with a value which is one-half or less than the coefficient of thermal expansion of the metal suspension. These materials are light and stiff and also have favorable resonance properties. In other words, these arms resonate at frequencies which are higher than the operating frequencies associated with the current actuator components. The arms made of the lighter, stiffer material provide for lower access times using less power and with better servoing capability.

FIG. 4B is a cross-sectional view of the attachment end 400 of the arm 134. The cross-sectional view shows the edges of the arm 134 as rounded. As mentioned previously, the edges of the arm do not have to be rounded. The wrap 170 can be used on other arm 134 edge shapes.

It should be noted that this attachment mechanism can be used in either a unitized or assembled actuator as is shown in FIGS. 1–3, or this attachment method and apparatus is equally applicable to an E-block or C-block assembly in which the arms are cast along with the rest of the actuator assembly.

Figure 5:
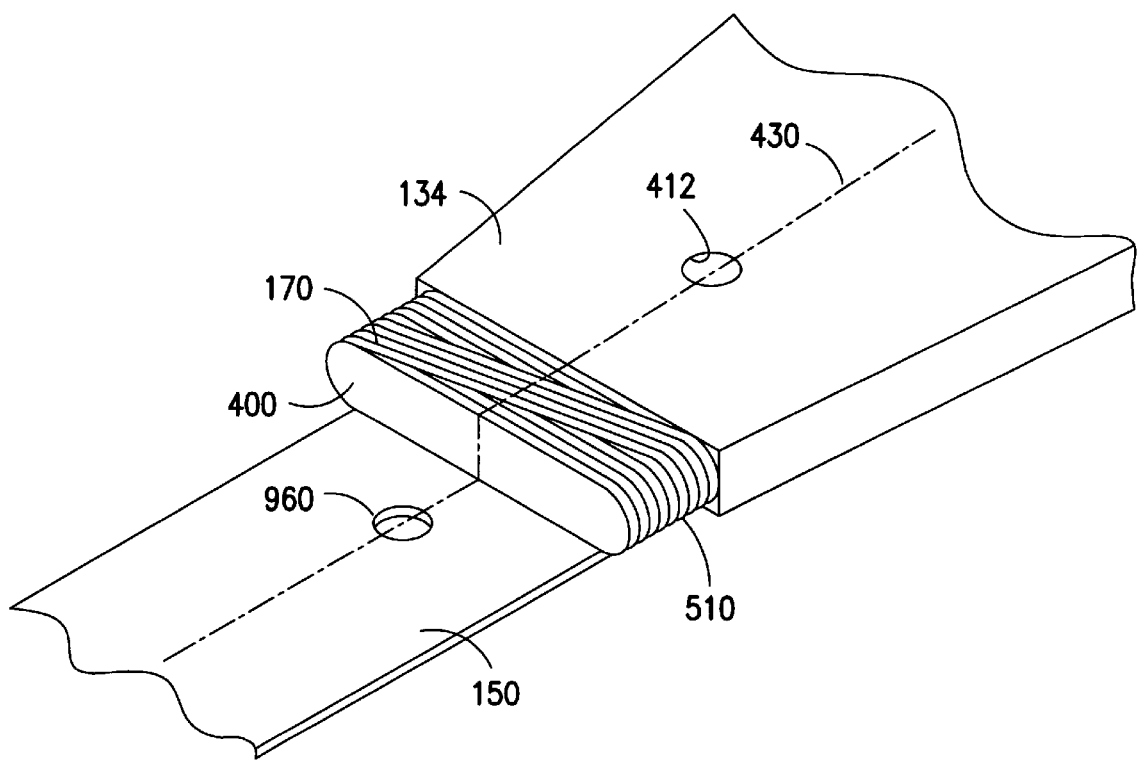
FIG. 5 is a perspective view showing a suspension attached to the suspension attachment member of the actuator arm.

FIG. 5 shows a perspective view of a suspension 150 attached to the attachment end 400 of the actuator arm 134. The stainless steel suspension is attached to the attachment end 400 of the actuator 134 using a wire 510 to form a wrap 170. A wrap 170 of relatively small diameter high tensile strength wire 510 wound about the suspension 150 and attachment end 400 of the arm 134 at high tension to produce a wire sleeve having the required clamping force to hold the suspension to the arm. For the sake of illustration, the wrap back winding shown in FIG. 5 laps over several wires at the start of the wrap back winding. This shows the principle of the wrap back. The winding would normally wrap back at just one overlapped wire. Stainless steel wire is available in a condition of tensile strength exceeding 300,000 psi. Stainless steel wire of 0.003 in. diameter wound at 2 lb. tension along the 0.2 in. length of the suspension base to arm interface creates a clamp sleeve consisting of 65 turns of wire. In actuality, the tension used during winding of the wire 510 can range from 0.5 lbs. to 3.0 lbs. The wire 510 is not necessarily limited to a diameter of 0.003 in. nor is it limited to a stainless steel material. Other metal wires could be used to form the wrap 170. Other materials could also be used to form the wrap 170 including all types of fibers, organic and inorganic, including nylon, Kevlar, graphite and polymer. This wrap 170 accommodates all of the dimensional tolerances of the arm and suspension dimensions. A simple close-spaced coil starting at the base end of the suspension attach surface and ending at the suspension end of the attach surface creates the required clamp sleeve.

Figure 6A:
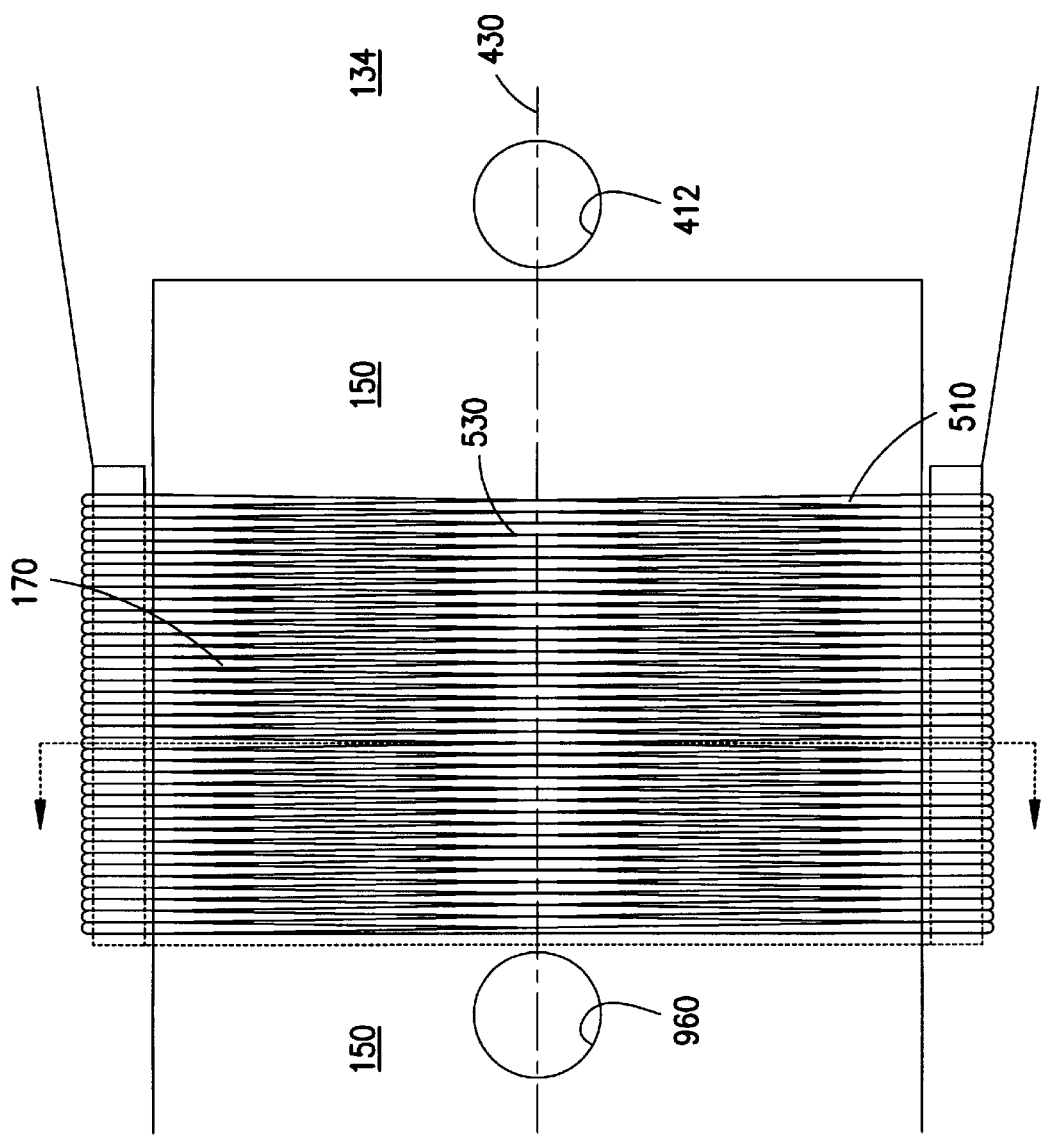
FIG. 6A is a top view of at least one suspension element attached to the arm member using a wire wound coil.

FIG. 6A shows a top view of suspension 150 attached to an arm 134 using a wrap 170. A coil of wire forms the wrap 170 and is started near the attachment end 400 of the suspension 150. The wire 510 is wound in a first direction toward the end of the arm 134 at a pitch which is twice the diameter of the wire 510. The wire 510 is then wound in a second direction by winding the wire 510 back to the starting point with the return wire filling in the space between the existing wires. FIG. 6A shows the wind back overlap of one wire which could not be clearly shown in FIG. 5. This creates a wrap 170 of wire 510 with an improved clamp sleeve since the return wire crosses over the wire wound in the first direction at the midpoint 530 of the suspension attachment end 400. This also produces an additional clamping force at the point of crossover 530. This also allows convenient mechanical termination of the wires by a method such as spot welding at the finish end of the wire to the start end of the wire. Spot welding can be set up so that the spot weld melts the two ends and fuses them to one another. Other means for attachment may also be used such as epoxying the two ends or using other adhesives. The wire 510 can also be coated with an adhesive activated by heat or ultraviolet light. After wrapping the wire, the heat or ultraviolet could be applied so that all the wire adhered to the surface of the suspension 150 or the surface of the arm 134. The end of the stainless steel suspension 150 is captured between the wrap 170 of wire 510 and the attachment end of the actuator arm 134.

The wrap 170 may be formed in any number of ways. For example, multiple wires or fibers may be laid down at a pitch which is n times the diameter of the fibers or wire. For example, if two wires or fibers are used to form the wrap

170, the wires or fibers are laid down at a pitch which is twice the diameter of the wires or fibers. This creates spaces equal to twice the diameter of the wires or fibers which are filled on the return wrap of the wires or fibers. If three wires or fibers are used to form the wrap 170, then the wires or fibers are laid down with a pitch of three times the diameter of the wire or fiber. This forms spaces which are filled on the return wrap in the second direction.

The arm 134 may be made of a material having a coefficient of expansion that is lower than the suspension material and lower than the wire 510. To assure a tight, rigid connection between the suspension 150 and the actuator arm 134, the wire 510 is wrapped at a tension that will hold the suspension 150 to the arm 134, even when the tension is lessened due to the expansion of the wire 510 due to the higher coefficient of thermal expansion when compared to the coefficient of thermal expansion of the arm 134.

Figure 6D:
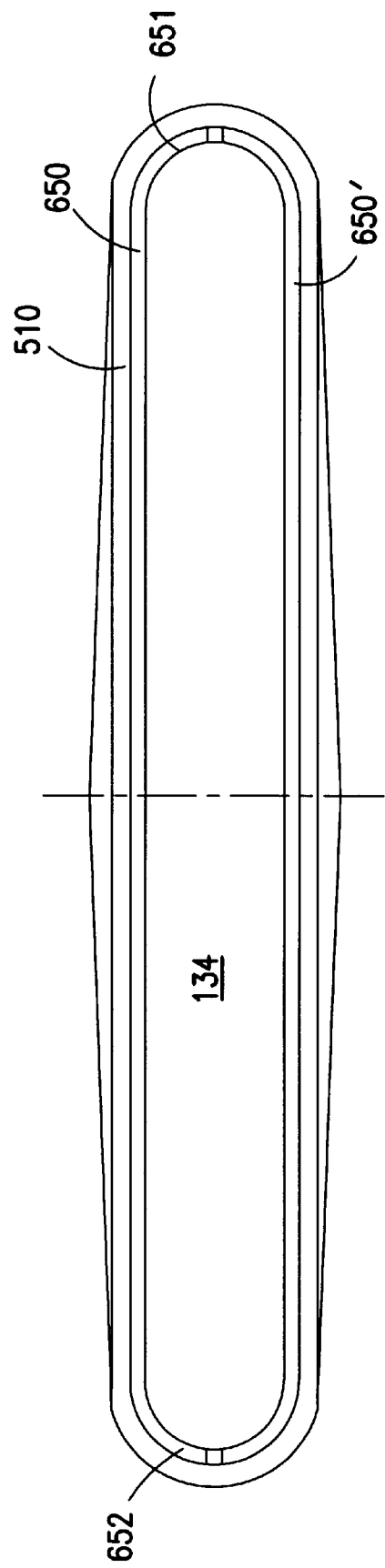
FIG. 6D is a cross-sectional view of FIG. 6A showing the crossover wrap for attaching suspensions with contoured edges.

FIG. 6B is a cross-sectional view of the wrap 170 shown in FIG. 6A. FIG. 6B shows two suspensions 150 and 150' attached to the arm 134. FIG. 6C is a cross-sectional view of the wrap 170 shown in FIG. 6A in which one suspension 150 is captured between the wrap 170 and arm 134. FIG. 6D is a cross-sectional view of the wrap 170 in which two contoured suspensions 650 and 650' are attached to the arm 134 with the wrap 170. The suspensions 650 and 650' have edges 651 and 652 which substantially match the contour of the edge of the arm 134. It should be noted that the wrap 170 can be used to attach one or two suspensions to the arm 134.

Now turning to FIG. 7, a side view of single suspension element 150 attached to the actuator arm 134 using the wrap 170 is shown. FIG. 8 shows a side view of a first suspension element 150 and a second suspension element 150' attached to the actuator arm 134 using the wrap 170. The wire wrapping process can easily accommodate the additional suspension 150'. The parts do not have to be tightly toleranced. The wrap 170 for a two suspension arm 134 requires a slightly longer wire 510. The wrap 170 is much lighter than a single swage plate. The resulting connection is light, and produces a rigid connection. The light and stiff materials used allow this unique attachment method, as well as supplying the superior high resonance performance necessary for optimum servo control of actuator position.

Figure 9:
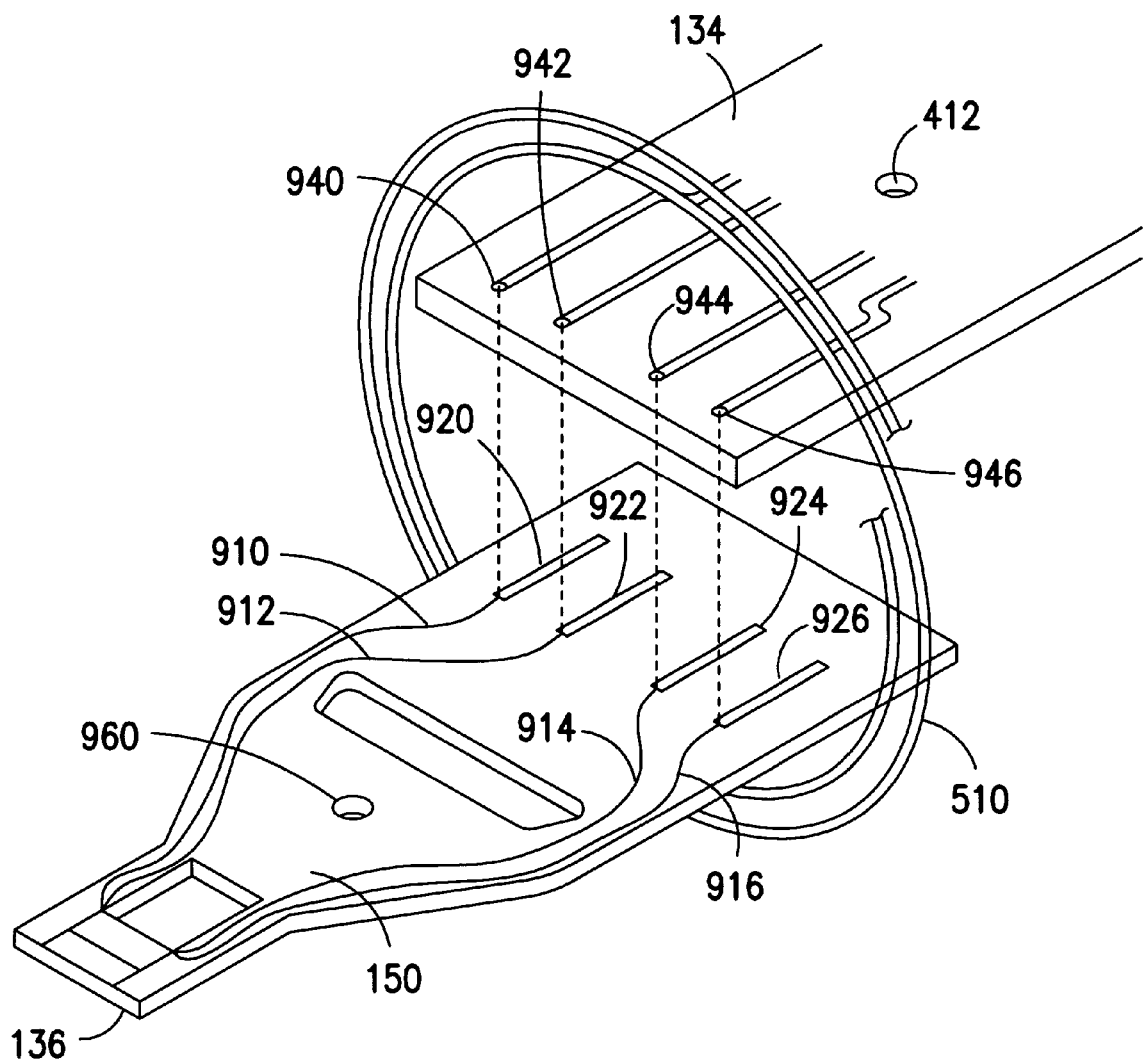
FIG. 9 is an exploded view of a suspension and arm attachment.

FIG. 9 shows an exploded view of a suspension 150 about to be attached to an arm 134. The suspension 150 includes a set of solid conductors 910, 912, 914 and 916. Each of the solid conductors terminates in a pad 920, 922, 924 and 926. The pads 920, 922, 924 and 926 are positioned near one end of the suspension 150. On the other end of the suspension 150 is the transducer 136. The solid conductors 910, 912, 914 and 916 make electrical connection to the transducer 136. The arm 134 includes a set of conductors which are embedded within the arm. The conductors emerge from within the arm 134 and then are located on the surface of the arm 134 adjacent the pads 920, 922, 924 and 926 on the suspension. The conductors or wires carry the reference numerals 940, 942, 944 and 946. The arm 134 and the suspension 150 are aligned with the help of alignment holes 412 and 960. When aligned properly, the pad 920 aligns with the wire 940. Similarly, the pad 922 aligns with wire 942, pad 924 aligns with wire 944, and pad 926 aligns with wire 946. The arm 134 and suspension 136 are then clamped together as part of the manufacturing process and the wire 510 is wrapped around the arm and suspension. The result is that the suspension 150 can be attached to the arm 134 using the wire attach method and, as it is being attached, the electrical connection between the wires 940, 942, 944 and 946 and the pads 920, 922, 924 and 926 can be made. The result is that the electrical connections to the transducer 136 do not have to be made in a separate step. The suspension 150 with solid conductors and pad is available from Hutchinson Technology of Hutchinson, Minn. as a TSA product.

It should be noted that other connection methods other than the wrap 170 could be used to make both the physical and electrical connections between the arm 134 and at least one suspension 150. In other words, swaging, riveting or applying the suspension with an adhesive could be used to make the physical and electrical connection between the arm 134 and suspension 150.

As discussed with respect to FIGS. 10A and 10B, in order to manufacture the arm, the suspension 150 is positioned with respect to the arm 134. Various alignment openings are used to position the suspension 150 with respect to the arm 134. The alignment openings may be used to align the suspension and the arm so that wires that would emerge from the arm are aligned with the solid conductors and pads on the suspension. It should be pointed out that the wires and the arm could be replaced with a flex cable that sat on or that is positioned adjacent the surface of the arm 134. Similarly, the solid conductors and pads on the suspension could also be replaced with a flex cable. The end result would be that the flex cables would be sandwiched between the arm 134 and the suspension 150. If two suspensions were attached to a single arm 134, there would be an added flex cable in the sandwich. Once the suspension 150 is positioned with respect to the arm 134, the two members are clamped in place.

FIGS. 10A and 10B show a tool or winding fixture 1000 used to wrap the suspension 150 and the arm 134. The winding fixture 1000 includes a slot 1010 which accommodates the arm 134 and the ends of at least one suspension 150. The slot is part of a clamp 1020 that is used to hold the arm 134 and the suspensions 150 and 150'. The winding fixture 1000 also includes a pin 1022 which passes through the cartridge opening 305 in the arm 134. The arm 134 and suspension 150 are first aligned by using tooling holes 412 and 305 for the arm 134 and tooling holes 960 and 970 for the suspension 150. After alignment, the arm 134 is clamped to mandrel or winding fixture 1000 and the suspension clamped to the arm and to the winding fixture 1000 prior to winding. An alternate technique would be to use a common alignment hole 413, on both the arm and the suspension to do a three-point alignment to assure both axial alignment and assembly length. Next the suspension 150 is clamped to the arm 134. The suspension locating pins are removed from the alignment openings to facilitate the wire wrap of the suspensions 150 and 150' to the arm 134. The suspensions 150 and 150' are now firmly attached to the arm 134 in the desired alignment. Other variations of this basic process are possible to accomplish a high-speed attachment design described herein. The winding fixture 1000 can then be rotated to begin the wrap 170 as depicted by arrow 1050. The wires or fibers used to form the wrap 170 are moved to produce the desired pitch on the winding and to produce a winding having wires or fibers in a first direction and a second direction.

The simplest method is to create a coil or wrap 170 that goes in one direction. The preferred embodiment, however, wraps the wire at a pitch which equals twice the diameter of the wire. However, other pitch multiples of wire diameter may be utilized for speed or alternate force distribution requirements, such as may be required for the electrical interconnect. The wire 510 is started at a position near the end or attachment end 400 of the arm 134 and is wound toward the end of the arm 134. The direction of the winding is then reversed or put into a second direction and the wire is wound such that the wire fits within the spaces formed in the coil as it was wound in the first direction. Advantageously, this produces an overlap 530 along the center line of the arm 430. At the point of overlap, an additional force is placed on the suspension 150. The wire is continued in its second direction until the point of origin of the wire is met. A spot weld is then used to attach the end of the wire to the beginning of the wire 510. This completes the wire coil 170 and produces a sleeve or clamp that holds the suspension or suspensions in place without any backlash or movement between the arm 134 and the suspension 150. It should be noted that any type of attachment technique can be used including adhesives used to attach the two ends or covering the wire with a heat-sensitive adhesive. In the event that a heat-sensitive adhesive covered wire is used, the assembly is heated to a temperature where the adhesive is activated, thereby resulting in a bonded wrap 170.

Advantageously, the wire is wrapped with a tension that allows it to expand and still hold the suspension to the arm with an adequate amount of force. In addition, the attachment method does not require that the arm and the suspension have tight tolerances. The wire wrap results in a connection which is also much lighter than a connection using a single or double swage plate. The wire wrap will be one eighth the weight of a swage plate and one sixteenth the weight of a double swage plate. As a result, faster access times are achievable. Since the weight is less, there is less resistance to using a longer arm and shorter suspension since the moment of inertia will be relatively low. A rigid bond is produced without shock loading the ceramic or composite material of the arm. This reduces the possibility of an obvious crack or a latent failure forming as a result of using other methods of attachment of the suspension to the arm such as swaging. The attachment method disclosed enables the use of an arm made of a ceramic or composite which is a lighter, stiffer material with a very low coefficient of thermal expansion to be rigidly coupled to a stainless steel suspension with a high coefficient of thermal expansion. The lighter, stiffer materials used for the arm resonate at higher frequencies beyond the operating range of the disk drive servo system; those materials allow a rigid attachment mechanism based on their low coefficient of thermal expansion. The rigid attachment over a range of temperatures is absolutely necessary to assure mechanical vibration coupling and prevent the suspension from moving with respect to the arm on a rotary actuator during multiple high speed seeks.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An actuator assembly for a disk drive comprising:
   an actuator arm;
   a suspension having a surface; and
   a wrap encircling the actuator arm more than one complete time, said suspension captured between the actuator arm and the wrap.

2. The actuator assembly of claim 1 wherein the actuator arm further comprises:
   a first end; and
   a second end for attaching a suspension, said second end having a rounded edge.

3. The actuator assembly of claim 1 wherein the actuator arm further comprises:
   a first end; and
   a second end for attaching a suspension, said second end having an attachment feature with a rounded edge.

4. The actuator assembly of claim 1 further comprising another suspension, said wrap encircling the actuator arm and the two suspensions, said two suspensions captured between the actuator arm and the wrap.

5. The actuator assembly of claim 1 wherein suspension further comprises solid conductors placed on the surface of said suspension.

6. The actuator assembly of claim 5 wherein the arm has electrical signal carrying wires embedded therein which emerge near the end of the arm, said electrical signal carrying wires aligned with the solid conductors on the surface of the suspension to form an electrical contact between the electrical signal carrying wires and the solid conductors on the surface of the suspension.

7. The actuator assembly of claim 5 further comprising a flex cable having electrical signal conductors embedded therein which emerge near the end of the flex cable, said electrical signal conductors at the end of the flex cable aligned with the solid conductors on the surface of the suspension to form an electrical contact between the electrical signal conductors and the solid conductors on the surface of the suspension.

8. The actuator assembly of claim 7 wherein the flex cable is attached to said arm.

9. The wrap of claim 1 wherein the wrap comprises a wire.

10. The wrap of claim 1 wherein the wrap comprises a tape.

11. The wire of claim 1 wherein the wire has a shape memory property.

12. An information handling system comprising:
    a base;
    a disk rotatably attached to said base; and
    an actuator assembly movably attached to said base, said actuator assembly further comprising:
       an arm;
       a suspension attached to said arm by a wrap surrounding the arm more than one complete time, said suspension positioned between the arm and the wrap; and
       a transducer attached to said suspension, said actuator assembly adapted to move a transducer to selected areas of the disk and to maintain the transducer in a transducing relationship with said disk.

13. The information handling system of claim 12 further comprising:
    a first signal-carrying wire; and
    a second signal-carrying wire, a portion of said first and a portion of said second signal-carrying wire encapsulated within the arm.

14. The information handling system of claim 13 further comprising
    a first solid conductor on the surface of the suspension; and
    a second solid conductor on the surface of the suspension, said first signal-carrying wire and said second signal-carrying wire emerging from the arm near the end to which the suspension is attached, said first signal-carrying wire forming an electrical contact with said first solid conductor, and said second signal-carrying wire forming an electrical contact with said second solid conductor.

15. The information handling system of claim 12 further comprising a flex cable which further comprises:

a first signal-carrying wire; and a second signal-carrying wire, a portion of said first and a portion of said second signal-carrying wire encapsulated within the flex cable, said flex cable associated with said arm.

16. The information handling system of claim 15 further comprising a first solid conductor on the surface of the suspension; and a second solid conductor on the surface of the suspension, said first signal-carrying wire and said second signal-carrying wire emerging from the flex cable near the end of the arm to which the suspension is attached, said first signal-carrying wire forming an electrical contact with said first solid conductor, and said second signal-carrying wire forming an electrical contact with said second solid conductor.

17. An actuator assembly for a disk drive comprising:

an arm;

a first suspension;

a wire wrapped more than one complete time around said arm and said first suspension, said wire wrap attaching said first suspension to said arm; and a transducer attached to said suspension.

18. The actuator assembly for a disk drive of claim 17 further comprising:

a second suspension, said wire wrapped around said arm, said first suspension, and said second suspension, said wire wrap attaching said first suspension and said second suspension to said arm.

19. The actuator assembly for a disk drive of claim 18 wherein said arm further comprises:

a yoke; and a coil portion of a voice coil motor attached to said yoke.

20. The actuator assembly for a disk drive of claim 19 further comprising a bearing cartridge, said arm and said yoke attaching to the bearing cartridge.

21. A method for attaching a suspension to the arm of a disk drive comprising:

positioning the suspension with respect to the arm;

clamping a wire and the suspension to the arm; and winding the wire more than one complete time around the suspension and around the arm.

22. The method for attaching a suspension to the arm of a disk drive system of claim 21 wherein winding the wire around the suspension includes placing a tension on the wire such that when the wire expands when the disk drive reaches operating temperature, the wire retains an adequate force to maintain the suspension in an attached position to the arm of the disk drive.

23. The method for attaching a suspension to the arm of a disk drive system of claim 21 wherein winding the wire around the suspension includes:

winding the wire in a first direction; and winding the wire in a second direction.

24. The method for attaching a suspension to the arm of a disk drive system of claim 23 wherein winding the wire in a second direction includes passing the wire over the wire wound in the first direction.

25. The method for attaching a suspension to the arm of a disk drive system of claim 24 further comprising attaching the free end of the wire to the clamped end of the wire.

26. The method for attaching a suspension to the arm of a disk drive system of claim 23 wherein winding the wire in a first direction includes spacing the wire at a pitch of twice the width of the wire so that spaces are formed in the wire winding as it is wound in the first direction.

27. The method for attaching a suspension to the arm of a disk drive system of claim 26 wherein winding the wire in a second direction includes placing the wire in the spaces formed while the wire was wound in the first direction.

28. A method for attaching a suspension to the arm of a disk drive comprising:

positioning the suspension with respect to the arm so that a conductor associated with the arm is aligned with a conductor associated with the suspension; and attaching the suspension to the arm.

29. The method for attaching a suspension to the arm of a disk drive system of claim 28 wherein attaching the arm and the suspension includes forming a wrap around the suspension and arm.

30. The method for attaching a suspension to the arm of a disk drive system of claim 28 wherein attaching the arm and suspension includes swaging the suspension to the arm.

* * * * *